United States Patent [19]

McArthur et al.

[11] Patent Number: 4,547,438
[45] Date of Patent: Oct. 15, 1985

[54] BATTERY ASSEMBLY

[75] Inventors: William J. McArthur, Maple Grove, Minn.; Roger W. Kelm, New Richmond, Wis.

[73] Assignee: Duracell Inc., Bethel, Conn.

[21] Appl. No.: 683,163

[22] Filed: Dec. 18, 1984

[51] Int. Cl.⁴ ............................................. H01M 2/00
[52] U.S. Cl. ...................................... 429/82; 429/86; 429/157; 429/159; 429/178
[58] Field of Search .................. 429/82, 86, 157, 159, 429/178, 179, 28, 27, 101, 156, 72

[56] References Cited

U.S. PATENT DOCUMENTS

| Re. 31,413 | 10/1983 | Jaggard | 429/27 |
|---|---|---|---|
| 2,606,941 | 8/1952 | Ruben | 429/157 X |
| 2,632,784 | 3/1953 | Marsal et al. | 429/157 |
| 2,864,880 | 12/1958 | Kaye | 429/157 |
| 3,220,886 | 11/1965 | Simonton | 429/157 |
| 3,220,888 | 11/1965 | Moore et al. | 429/157 |
| 3,542,603 | 11/1970 | Simon | 429/157 X |
| 3,575,725 | 4/1971 | Kaye | 429/157 |
| 3,736,189 | 5/1973 | Ciliberti | 429/157 X |
| 3,741,810 | 6/1973 | Dafler et al. | 429/28 |
| 3,909,297 | 9/1975 | Zeitner, Jr. et al. | 429/29 |
| 3,914,133 | 10/1975 | Baldwin et al. | 429/157 X |
| 3,975,210 | 8/1976 | Warnock | 429/157 X |
| 3,986,894 | 10/1976 | Ciliberti, Jr. | 429/153 |
| 4,087,595 | 5/1978 | Ciliberti, Jr. | 429/153 |
| 4,091,186 | 5/1978 | Ott et al. | 429/157 |
| 4,224,385 | 9/1980 | Ciliberti, Jr. et al. | 429/66 |

FOREIGN PATENT DOCUMENTS 1319780 6/1973 United Kingdom .

OTHER PUBLICATIONS

Four Photographs of a Battery Containing Metal Air Cells.

Primary Examiner—Anthony Skapars

[57] ABSTRACT

The disclosure describes a battery assembly which comprises several gas depolarizable electrochemical cells, e.g., metal/air cells, stacked electrically in series along a first dimension. Each cell has first and second electrodes of opposite polarities. The battery assembly also comprises a housing for containing the stack of cells. The housing includes a structure for ventilating the interior of the housing and further includes first and second opposite end walls which lie perpendicular to the first dimension. The stack of cells is arranged within the housing with the first electrode of the initial cell of the stack facing the first wall and the second electrode of the final cell of the stack facing the second wall. The battery assembly further includes first and second electrically conductive connectors disposed within the housing. The first connector has a first end electrically coupled to the first electrode of the initial cell and a second end disposed adjacent the first wall. The second connector has a first end electrically coupled to the second electrode of the final cell and a second end also disposed adjacent the first wall. The battery assembly further comprises first and second terminals which are electrically coupled to the first and second connectors, respectively, and extend through the first wall to the exterior of the housing.

16 Claims, 9 Drawing Figures

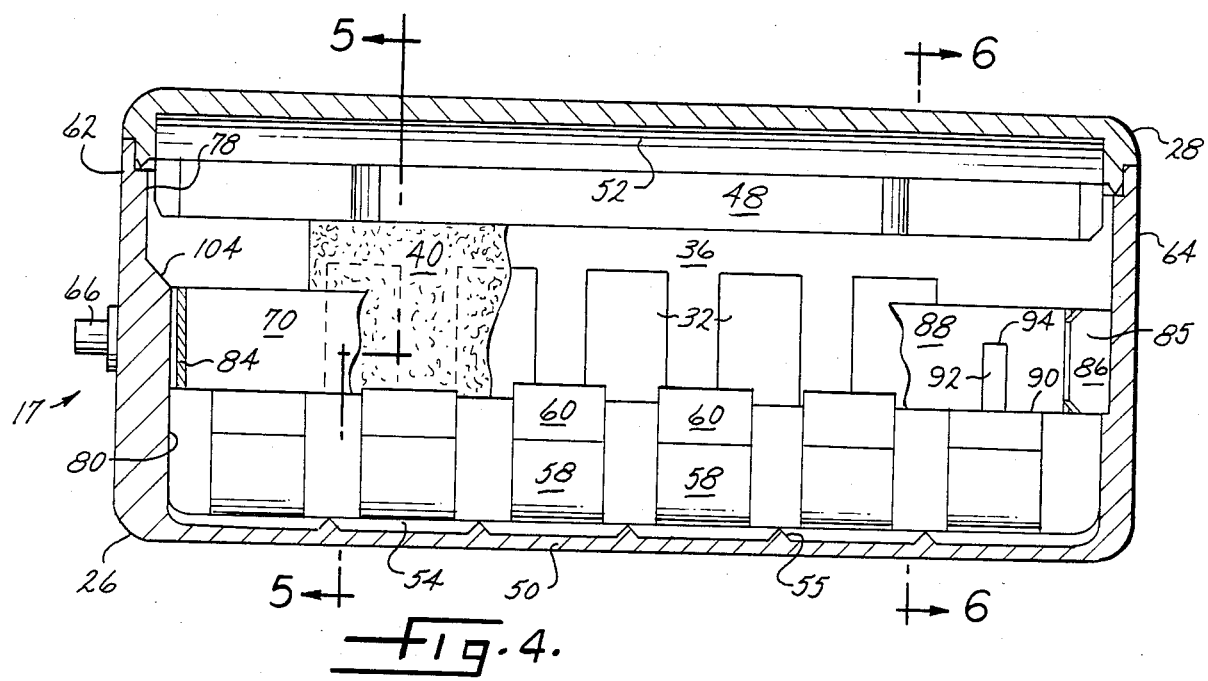
Fig. 4.
Fig. 7.
Fig. 8.
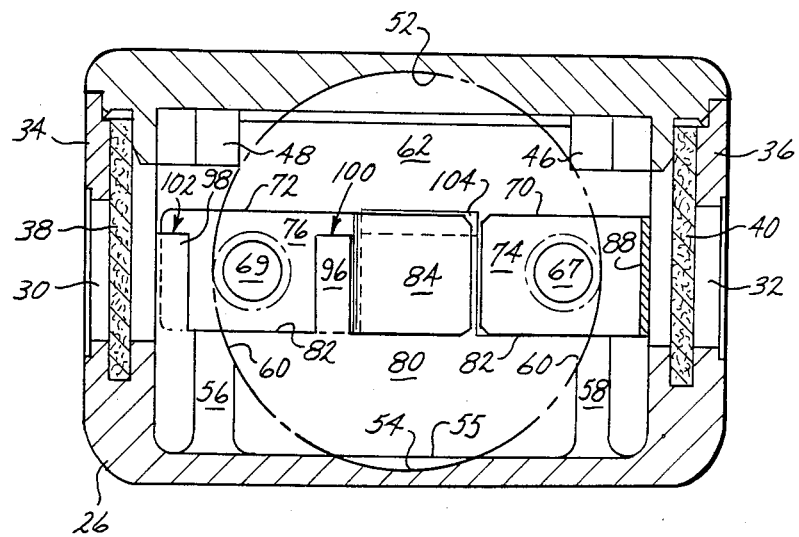
Fig. 5.

BATTERY ASSEMBLY

TECHNICAL FIELD

The present invention relates to batteries. In particular, it relates to batteries comprising an assembly of electrochemical cells.

BACKGROUND ART

An electrochemical cell is a container which has a positive terminal and a negative terminal and is filled with certain chemically active substances. These substances interact with one another to generate a potential difference, i.e., a voltage, between the positive terminal and the negative terminal. The magnitude of this voltage depends principally on the specific chemical interaction which takes place within the cell. For example, a mercury cell generates a voltage of about 1.2 volts due to the interaction of the zinc and mercury oxide contained within the cell.

To obtain a voltage greater than the voltage generated by a single cell, several cells may be assembled in a housing and electrically interconnected so that their voltages add, i.e., connected in series. For example, a 9-volt battery, which is typically used to power a transistor radio, may comprise an assembly of six 1.5-volt cells connected in series. The cells and electrical connectors must be securely maintained in place within the housing in order to avoid short circuits and broken connections and provide a reliable output.

Previous battery assemblies have several undesirable characteristics associated with both the assembly of cells and the cells themselves. For example, many previous battery assemblies consist of as many as 25 or more separate components. Such a large number of components increases the cost and complicates manufacture. In addition, many previous battery assemblies are difficult to assemble not only because they consist of a large number of components but also because the components may fit into the housing in many different ways other than the correct way.

With respect to the cells themselves, the shelf life of many cells utilized in previous battery assemblies is limited. Since there is no way to dissociate the active chemical substances within many cells, chemical interactions within the cell can continue to drain the cells even when the battery assembly is not in use. Further, many cells contain one or more substances which may pose an environmental hazard if it escapes from the cell. For example, the mercury contained in a mercury cell may escape to the environment under extreme operating conditions, such as when the cell is overly discharged.

Metal/air cells have the advantage that the substances utilized within the cell, e.g., zinc and air, are relatively benign to the environment. These cells are also approximately 45 percent lighter than mercury cells. However, previous battery assemblies utilizing metal/air cells frequently include apertures in the housing to provide a source of air for the cells. While these apertures allow air to enter the housing, they may also allow water and objects which may be inserted through the apertures to enter the housing and damage the battery assembly.

DISCLOSURE OF THE INVENTION

A general object of the present invention is to provide an improved battery assembly. Specific objects include providing an assembly of electrochemical cells in which the cells are efficiently packaged using a minimum of components to reduce cost and simplify manufacture; in which components can be assembled in the housing in only one way to ensure correct assembly; in which the cells and electrical connectors are securely maintained in place to ensure reliable output; in which the cells are adequately ventilated but water or objects are prevented from entering the housing and damaging the battery assembly; and in which the active chemical substances can be dissociated to extend shelf life and do not pose a hazard to the environment.

Accordingly, the present invention may be embodied by a battery assembly which comprises several gas depolarizable electrochemical cells, e.g., metal/air cells, stacked electrically in series along a first dimension. Each cell has first and second electrodes of opposite polarities. The battery assembly also comprises a housing for containing the stack of cells. The housing includes a structure for ventilating the interior of the housing and further includes first and second opposite walls which lie perpendicular to the first dimension. The stack of cells is arranged within the housing with the first electrode of the initial cell of the stack facing the first wall and the second electrode of the final cell of the stack facing the second wall. The battery assembly further includes first and second electrically conductive connectors disposed within the housing. The first connector has a first end electrically coupled to the first electrode of the initial cell and a second end disposed adjacent the first wall. The second connector has a first end electrically coupled to the second electrode of the final cell and a second end also disposed adjacent the first wall. The battery assembly further comprises first and second terminals which are electrically coupled to the first and second connectors, respectively, and extend through the first wall to the exterior of the housing.

Thus, the battery assembly according to the present invention utilizes few coponents, preferably including metal/air cells to minimize any hazard to the environment. Further, the invention features a design which allows these components to be securely and efficiently assembled.

The invention may also be embodied by a battery assembly comprising one or more gas depolarizable electrochemical cells and a housing for containing the cells. The housing includes a first structure fashioned from a generally impervious material and having at least one aperture. The housing also includes a second structure fashioned from a hydrophobic, porous material, i.e., a material which has small pores and which permits the passage of gases but resists the passage of water. Further, the housing includes a mechanism for blocking the aperture of the first structure with the second structure. Thus, access into the housing through the aperture is limited by the hydrophobic, porous material, which allows air to enter the housing but prevents entry by water or other objects The present invention also features an air-tight container for a battery assembly of metal/air cells. For example, the battery assembly may be sealed inside a pouch fashioned from a plastic film. This dissociates the active chemical substances of the cells, i.e., dissociates the air from the zinc, and prolongs the shelf life of the battery assembly.

Further objects, aspects and advantages of the invention will become apparent upon studying the following detailed description and accompanying drawings of a preferred embodiment of the invention and the claims to the invention.

BRIEF DESCRIPTION OF THE DRAWINGS

In the accompanying drawings,

FIG. 4 is a sectional elevation view of the battery assembly of FIG. 2 viewed along lines IV—IV without the electrochemical cells but with the cover and showing portions of the case and positive connector cut away;

FIG. 5 is a sectional elevation view of the battery assembly of FIG. 4 viewed along lines V—V;

FIG. 7 is an edge view of the negative connector of the battery assembly of FIG. 1;

FIG. 8 is an edge view of the positive connector of the battery assembly of FIG. 1.

BEST MODE FOR CARRYING OUT THE INVENTION

Figure 1:
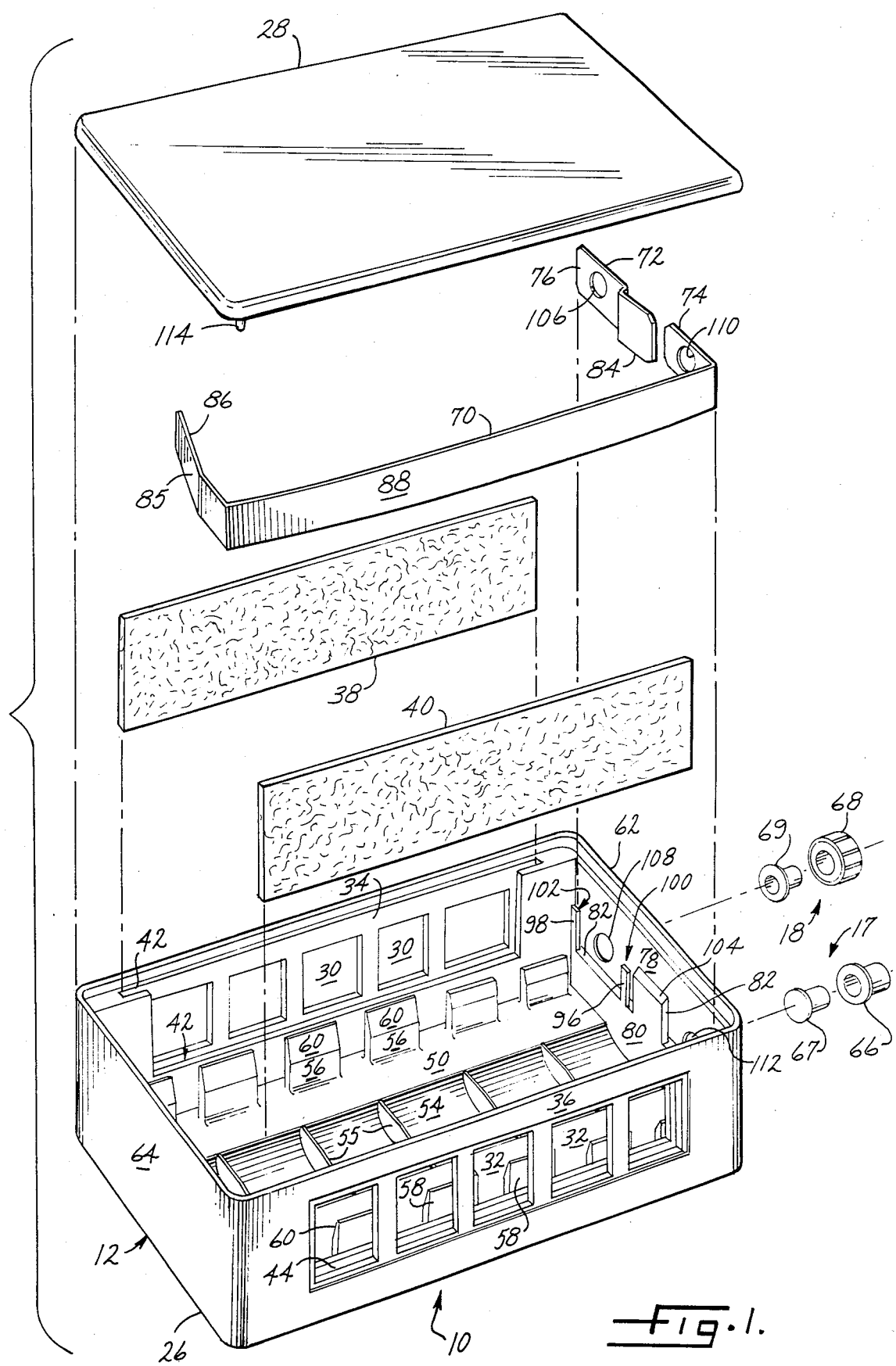
FIG. 1 is an exploded perspective view of a battery assembly embodying the present invention showing all components except the electrochemical cells.
Figure 2:
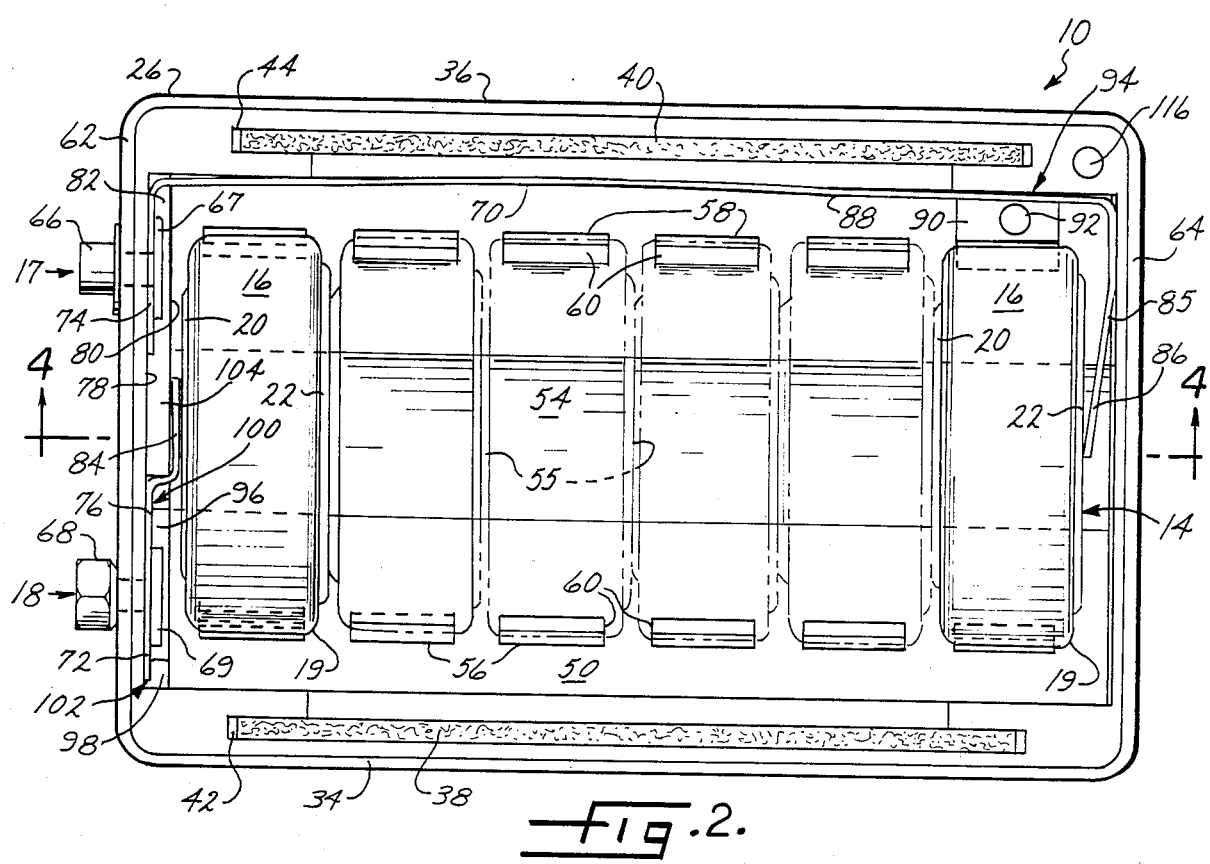
FIG. 2 is a plan view of the battery assembly of FIG. 1 with the cover removed.
Figure 3:
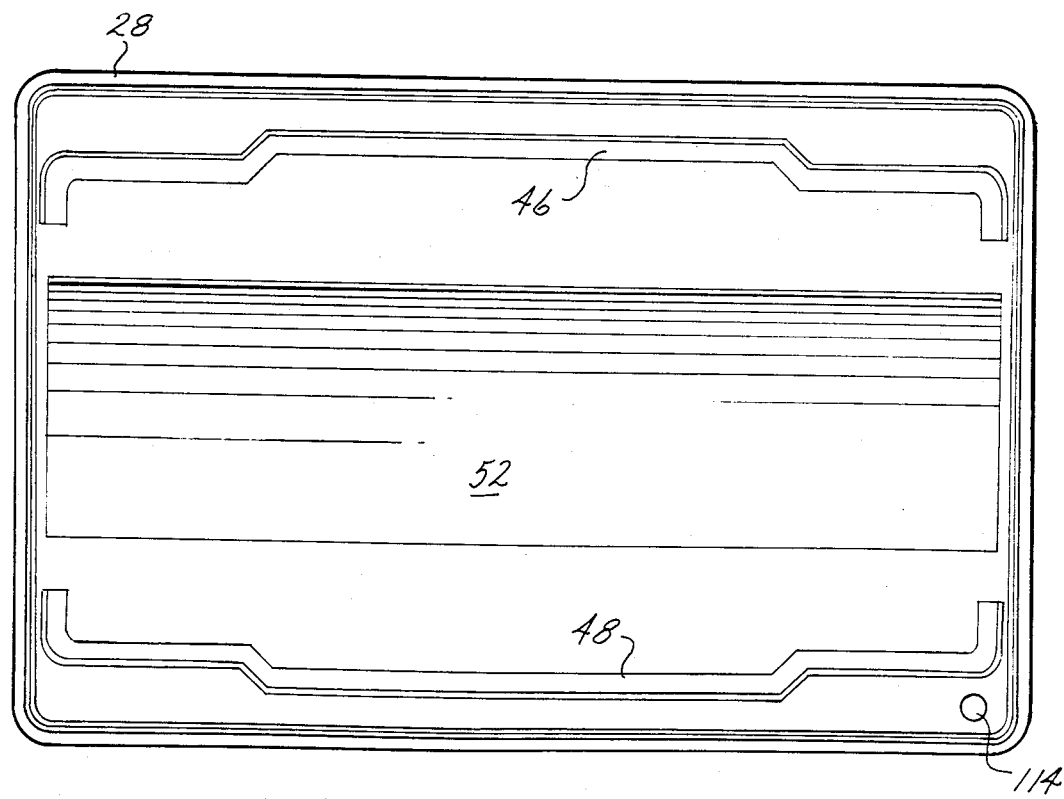
FIG. 3 is a plan view of the interior surface of the cover of the battery assembly of FIG. 1.

As shown in FIGS. 1, 2 and 3, an exemplary battery assembly 10 embodying the present invention generally comprises a housing 12 containing a stack 14 of gas depolarizable electrochemical cells 16 electrically coupled to a pair of positive and negative terminals 17, 18. The cells 16 are well known in the art, as evidenced by Jaggard, U.S. Pat. No. Re. 31,413, and are commonly available, for example, from Duracell Inc. under the trademark ACTIVAIR. The cells may have any of a variety of configurations, including a rectangular parallelepiped, without departing from the scope of the invention, However, in the exemplary embodiment, each cell 16 is generally cylindrically shaped and includes an electrically conductive cup-shaped structure 19 which serves as a cathode and an electrically conductive cap 20 which serves as an anode. An anode material, such as amalgamated zinc, which is contained within the cell 16, interacts with oxygen in air to generate a potential difference between the cathode 19 and the anode 20. The base portion 22 of the cathode 19 contains a plurality of apertures (not shown) which allow air to diffuse onto the cathode material and sustain the potential difference. The cells 16 are arranged electrically in series within the stack 14 with the anode 20 of one cell 16 abutting the base portion 22 of the cathode 19 of the adjacent cell 16. While any suitable number of cells may comprise a stack, the stack 14 of the illustrated embodiment comprises six cells 16.

The housing may be fashioned as any suitably rigid structure which includes a means for ventilating the interior of the housing to provide an adequate supply of air to the cells. In the illustrated embodiment, the housing 12 comprises an elongate parallelpiped having a long dimension aligned with the axis of the stack 14 of cells 16. The housing 12 includes a case 26 and a cover 28 which may be fixedly attached to one another, for example, by ultrasonic welding. Both are fabricated from a rigid impervious polymeric material, e.g., an ABS resin, but the case 26 has opposed sets of apertures 30, 32 in opposite side walls 34, 36 which allow air to pass through the housing 12.

To prevent undesirable materials such as water or objects which may be inserted through the apertures 30, 32 from entering the housing 12 and yet allow air to pass through the housing 12, thin inserts 38, 40 are disposed along the interior of the walls 34, 36 adjacent the apertures 30, 32. The inserts 38, 40 are preferably fabricated from a rigid hydrophobic porous polymeric material, such as high density polyethylene. While the material should allow sufficient air into the housing to meet the desired limiting current capability of the cells, many different pore sizes and void volumes are nonetheless suitable. For example, a pore size of 30 microns and a void volume of 30 percent should provide satisfactory results for a variety of applications.

The inserts 38, 40 are disposed in slots 42, 44 formed in the walls 34, 36, and the inserts 38, 40 and slots 42, 44 are preferably dimensioned so that the inserts 38, 40 fit tightly within the slots 42, 44 and closely adjacent to the apertures 30, 32. Ribs 46, 48 extending into the housing 12 from the cover 28 abut the inserts 38, 40 and serve to further maintain the inserts 38, 40 tightly against the apertures 30, 32.

Figure 6:
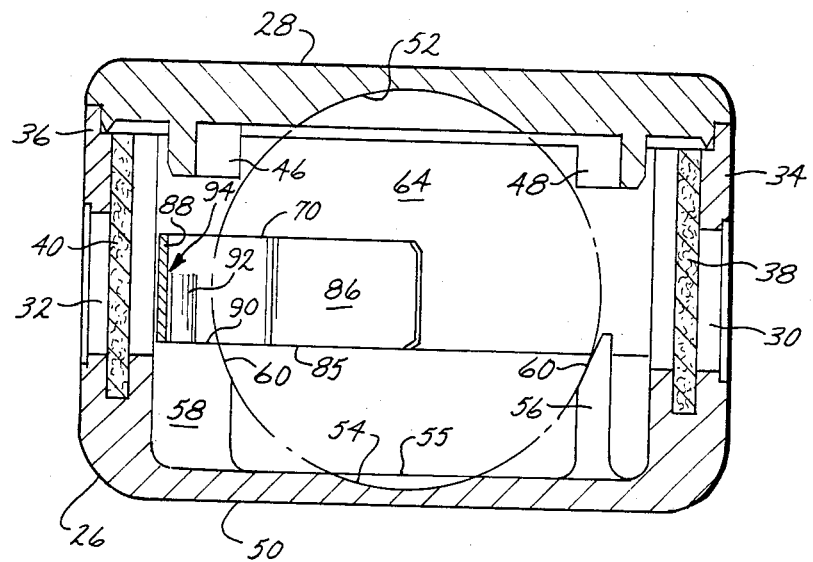
FIG. 6 is a sectional elevation view of the battery assembly of FIG. 4 viewed along lines VI—VI.

To immobilize the stack 14 of cells 16 within the housing 12, the cover 28 and the base 50 of the case 26 include opposed channels 52, 54 which extend parallel to the long dimension of the housing 12, as shown in FIGS. 2 and 3. The channels 52, 54 have an arc shaped cross section, as shown in FIGS. 5 and 6, and the radius of each arc corresponds to the radius of the side walls of the cylindrically shaped cells 16. The stack 14 of cells 16 is disposed snugly between the case 26 and the cover 28 within both channels 52, 54, each channel 52, 54 preventing movement of the cells 16 perpendicular to the axis of the stack 14. Ridges 55 disposed laterally across the channel 54 in the case 26 enhance the mechanical integrity of the case 26 and limit movement of the cells 16 parallel to the axis of the stack 14.

To further prevent perpendicular movement of the cells 16, several pairs of opposed legs 56, 58 extend from the base 50 of the case 26 into the interior of the housing 12. The opposed legs 56, 58 face each other along a line perpendicular to the long dimension of the housing 12. The channel 54 in the base 50 extends between each pair of opposed legs 56, 58, and each cell 16 in the channel 54 lies between a pair of opposed legs 56, 58. The legs 56, 58 terminate in tangential surfaces 60 which lie adjacent the cell 16 at opposed locations on the side wall of the cell 16, confining the cell 16 between the tangential surfaces 60 of the pair of opposed legs 56, 58.

The stack 14 of cells 16 is disposed within the housing 12 with the anode 20 of the initial cell 16 facing one end wall 62 and the cathode 19 of the final cell 16 facing the opposite end wall 64. However, both the positive and negative terminals 17, 18 are located in the first end wall 62. The positive terminal 17 includes a stud 66 attached to the exterior of the first end wall 62 by a rivet 67 which extends through the first end wall 62 to the interior of the housing 12. Similarly, the negative terminal 18 includes a socket 68 attached to the exterior of the first end wall 62 by a rivet 69 which extends through the first end wall 62 to the interior of the housing 12. Positive and negative connectors 70, 72 electrically interconnect the positive terminal 17 to the cathode 19 of the final cell 16 and the negative terminal 18 to the anode 20 of the initial cell 16, respectively. Both connectors 70, 72 are fashioned from a thin strip of nickel and include terminal ends 74, 76 disposed against a first portion 78 of the inside surface of the first end wall 62. The rivets 67, 69 of the positive and negative terminals 17, 18 extend through the terminal ends 74, 76 of the positive and negative connectors 70, 72, respectively, holding the terminal ends 74, 76 in place. An embossed portion 80 of the inside surface of the first end wall 62 extends below and between the terminal ends 74, 76, defining a ledge 82 which the terminal ends 74, 76 abut.

As shown in FIGS. 2 and 5, the negative connector 72 has an anode engaging end 84 which rests against the embossed portion 80 of the first end wall 62 between the terminal ends 74, 76 and in contact with the anode 20 of the initial cell 16 of the stack 14. Since the anode engaging end 84 of the negative connector 72 is maintained in a separate plane from the terminal end 74 of the positive connector 70 by the embossed portion 80 of the first end wall 62, the connectors 70, 72 are completely isolated from one another, virtually eliminating any possibility of a short circuit between them. Alternatively, the negative connector 72 may be eliminated by extending the head of the rivet 69 of the negative terminal 18 into contact with the anode 20 of the initial cell 16.

As shown in FIGS. 2, 4, 5, and 6, the positive connector 70 includes a cathode engaging end 85 disposed against the opposite end wall 64 in contact with the cathode 19 of the final cell 16 of the stack 14. The cathode engaging end 85 includes an inwardly directed portion 86 which resiliently bears against the stack 14 of cells 16, preventing movement of the cells 16 in a direction parallel to the long dimension of the housing 12. An intermediate portion 88 of the positive connector 70 extends from the cathode engaging end 85 along the side wall 36 to the terminal end 74. The intermediate portion 88 rests on a ledge 90 defined by the second leg 58 nearest the second end wall 64. A post 92 spaced from the second side wall 36 extends from the ledge 90 toward the cover 28 and defines a slot 94 within which the intermediate portion 88 is disposed. The post 92 serves to maintain the positive connector 70 in position along the side wall 36 and to prevent the intermediate portion 88 from contacting any of the cells 16 and shorting the battery assembly 10. Several of the second legs 58 extend above the edge of the intermediate portion 88 closest the base 50 of the case 26, further preventing the intermediate portion 88 from contacting the stack 14 of cells 16 and shorting the battery assembly 10.

The battery assembly embodying the present invention may include several additional components without departing from the scope of the invention. For example, various sealants may be utilized within the housing 12 to further prevent water from entering the housing 12. The stack 14 of cells 16 may even be encased in a hydrophobic sleeve to further ensure that the cells 16 do not come in contact with water.

Also, certain absorbent materials may be disposed within the housing 12 to ensure that any substances which may leak from the cells 16 due to misuse, e.g., severly excessive discharging, would be contained within the housing 12.

In accordance with the invention, the battery assembly 10 may be easily and reliably assembled. Not only does the battery assembly 10 comprise relatively few components, i.e., sixteen, but also the components are configured so that they are held securely in place in the proper location and orientation during assembly. For example, the inserts 38, 40 fit snugly within the slots 42, 44 in the side walls 34, 36, allowing the case 26 to be turned upside down without having the inserts 38, 40 fall from the slots 42, 44.

Further, the positive and negative connectors 70, 72 fit snugly within the housing 12 in the proper location and orientation in but a single position. The terminal end 76 of the negative connector 72 is larger than the terminal end 74 of the positive connector 70. Consequently, it will only fit against the first portion 78 of the first wall 62 in the space between the embossed portion 80 and the side wall 34 proximate the negative terminal 18. Two posts 96, 98 spaced from the first portion 78 and extending from the ledge 82 toward the cover 28 define slots 100, 102 within which the terminal end 76 of the negative connector 72 is held against the first portion 78. While the first portion 78 and the embossed portion 80 of the inside surface of the first wall 62 lie in separate parallel planes, the terminal end 76 and the anode end 84 of the negative connector 72 lie in separate non-parallel planes as shown in FIG. 7. Consequently, as the terminal end 76 of the negative connector 72 is inserted in the slots 100, 102, the anode engaging end 84 slides up onto the embossed portion 80 via an inclined surface 104, resiliently engaging the embossed portion 80 and securely holding the negative connector 72 in place with the rivet hole 106 in the negative connector 72 aligned with a rivet hole 108 in the first end wall 62.

The positive connector 70 is also held securely in position prior to inserting the rivet 67. The terminal end 74 and the cathode engaging end 85 extend from the intermediate portion 88 at obtuse angles, as shown in FIG. 8. Consequently, when the positive connector 70 is inserted within the housing 12, the terminal end 74 and the cathode engaging end 85 resiliently engage the end walls 62, 64, securing the positive connector 70 in place with the rivet hole 110 in the positive connector 70 aligned with a rivet hole 112 in the first end wall 62. The resilient interaction between the ends 74, 85 of the positive connector and the end walls 62, 64 bows the intermediate portion 88 outward toward the side wall 36, further ensuring separation between the intermediate portion 88 and the cells 16 of the stack 14. With the positive and negative connectors 70, 72 securely held in their proper position, the rivets 67, 69 may easily be inserted and the stud 66 and socket 68 riveted in place.

Once the inserts 38, 40, the positive and negative connectors 70, 72, and the positive and negative terminals 17, 18 are installed, the cells 16 may be assembled into the housing 12. The ridges 55 in the channel 54 in the case 26 ensure proper orientation of the cells 16 within the stack 14, i.e., ensure that the anode 20 of the initial cell 16 contacts the negative connector 72 and the cathode 19 of the final cell 16 contacts the positive connector 70 and that the cathode 19 of one cell 16 abuts the anode 20 of an adjacent cell 16. The upturned portion of the cathode engaging end 85 of the positive connector 70 ensures that the cells 16 are securely held in position even before the cover 28 is joined to the case 26. A pin 114 projecting from the cover 28 engages a hole 116 in the case 26 to ensure proper orientation of the cover 28 on the case 26 while the ribs 46, 48 in the cover 28 further serve to properly guide and position the cover 28 on the case 26.

Figure 9:
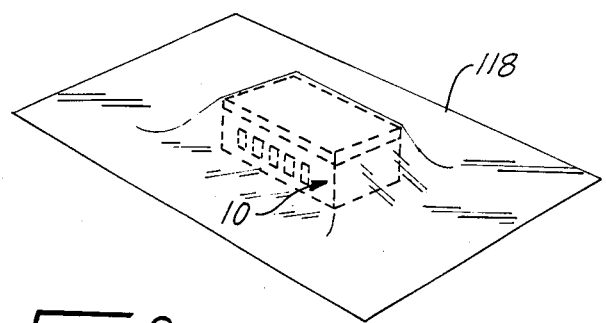
FIG. 9 is a perspective view of the battery assembly of FIG. 1 in an air-tight pouch.

As shown in FIG. 9, the battery assembly 10 may be packaged in an air-tight pouch 118 to dissociate the air from the amalgamated zinc within the cells 16 and prolong shelf life. While any suitable impervious material may be used to package the battery assembly, a metalized polyester film is preferred. The battery assembly 10 may be sealed in a vacuum within the pouch 118 or may be sealed within the pouch 118 with a gas that does not react with the anode material within the cells. However, in the preferred embodiment, the battery assembly 10 is sealed within the pouch 118 in air. The small amount of air trapped within the pouch 118 does not significantly effect the shelf life of the battery assembly 10.

While a particular embodiment of the invention has been described above, the invention is not limited to that embodiment. Alternative embodiments and modifications which would still be encompassed by the invention may be made by those skilled in the art, particularly in light of the foregoing teachings. Therefore, the following claims are intended to cover any alternative embodiments, modifications or equivalents which may be included within the spirit and scope of the invention as claimed.

We claim:

1. A battery assembly comprising a plurality of gas depolarizable electrochemical cells, each cell having first and second electrodes of opposite polarities and the plurality of cells being stacked electrically in series along a first dimension, a housing for containing the plurality of cells, the housing including means for ventilating the interior of the housing and further including first and second opposite walls perpendicular to the first dimension, the stack of cells being arranged within the housing with the first electrode of the initial cell of the stack facing the first wall and the second electrode of the final cell of the stack facing the second wall, first and second electrically conductive connectors disposed within the housing, the first connector including first end means electrically coupled to the first electrode of the initial cell and second end means disposed adjacent the first wall and the second connector including first end means electrically coupled to the second electrode of the final cell and second end means disposed adjacent the first wall, and first and second electrically conductive terminal means electrically coupled to the second end means of the first and second connectors, respectively, and extending through the first wall to the exterior of the housing.

2. The battery assembly of claim 1 wherein the housing is configured as a rectangular parallelpiped having a long dimension extending in the direction of the first dimension.

3. The battery assembly of claim 1 further comprising an air-tight container and wherein the housing and first and second terminal means are disposed entirely within the container.

4. The battery assembly of claim 3 wherein the container comprises a sealed pouch fashioned from a metallic polyester film.

5. The battery assembly of claim 1 wherein the housing further includes at least a third wall extending between the first and second walls, said third wall being fashioned from a generally impervious material and wherein the ventilating means includes at least one aperture in the third wall and further includes a member fashioned from a porous polymeric material, said battery assembly further comprising means for blocking the aperture of the third wall with the porous member whereby access into the housing through the aperture is limited by the porous polymeric member.

6. The battery assembly of claim 5 wherein the third wall is fashioned from an impervious polymeric material and the porous member is fashioned from a hydrophobic porous polymeric material.

7. The battery assembly of claim 5 wherein the blocking means includes means formed in the housing and disposed proximate the aperture for engaging the porous member and wherein the porous member comprises a thin insert disposed adjacent the aperture within the engaging means.

8. A battery assembly comprising a plurality of cylindrically shaped electrochemical cells stacked along a first dimension, a housing for containing the plurality of stacked cells, the housing having a plurality of walls, means for limiting movement of at least one cell perpendicular to the first dimension including at least one pair of spaced projections facing one another along a line perpendicular to the first dimension and extending from one wall into the interior of the housing proximate the side wall of the cell and further including an arc shaped channel disposed along one wall parallel to the first dimension, the radius of the arc corresponding to the radius of the side wall of the cell and the cell being disposed within the channel with the axis of the cell parallel to the first dimension, and means for limiting movement of at least one cell parallel to the first dimension including first and second connector means respectively disposed against the first and second ends of the stack, at least one of the connector means including spring means for compressing the stack along the first dimension.

9. The battery assembly of claim 8 wherein the arc shaped channel and the pair of spaced projections are located in the same wall, with the arc shaped channel disposed between the spaced projections.

10. The battery assembly of claim 8 wherein the perpendicular movement limiting means further comprises a second arc shaped channel disposed in a second wall of the housing opposing the other arc shaped channel.

11. A battery assembly comprising a plurality of electrochemical cells, each cell having first and second electrodes of opposite polarities and the plurality of cells being arranged electrically in series, a housing for containing the cells, the housing including first and second opposite walls and at least a third wall extending between the first and second walls, first and second electrically conductive connectors, the first connector including first end means electrically coupled to the first electrode of the initial cell of the arrangement and second end means disposed adjacent the first wall and the second connector including first end means electrically coupled to the second electrode of the final cell of the arrangement, second end means disposed adjacent the first wall, and intermediate means for electrically interconnecting the first and second end means, ledge means disposed along at least one wall for supporting at least one connector, first separating means disposed along the first wall for separating the second end means of the first and second connectors, and second separating means for separating the intermediate means from the arrangement of cells.

12. The battery assembly of claim 11 wherein the ledge means comprises first and second ledges proximate the first and second end means, respectively, of the second connector.

13. The battery assembly of claim 12 wherein the first ledge is disposed along the third wall and the second ledge is disposed along the first wall.

14. The battery assembly of claim 11 wherein the first separating means comprises a raised portion of the first wall between the second end means of the first and second connectors, wherein the second end means of the first connector is disposed in slots adjacent the first wall and wherein the first end means of the first connector resiliently engages the raised portion locking the first connector in place.

15. The battery assembly of claim 11 wherein the second separating means includes a slot adjacent the first end means of the second connector, the second connector being disposed in the slot, and a stop adjacent the second end means whereby the intermediate means is maintained in position along the first wall.

16. The battery assembly of claim 11 wherein the second separating means includes a bow in the intermediate means directed away from the arrangement of cells.

* * * * *